United States Patent [19]
Kraus

[11] 3,820,416
[45] June 28, 1974

[54] VARIABLE RATIO ROTARY MOTION TRANSMITTING DEVICE

[75] Inventor: Charles E. Kraus, Austin, Tex.

[73] Assignee: Excelermatic, Inc., Leesburg, Pa.

[22] Filed: Jan. 5, 1973

[21] Appl. No.: 321,452

[52] U.S. Cl.................... 74/690, 74/200, 74/691
[51] Int. Cl..................... F16h 15/08, F16h 37/06
[58] Field of Search.............. 74/690, 691, 199, 200

[56] References Cited
UNITED STATES PATENTS

| | | | |
|---|---|---|---|
| 2,850,911 | 9/1958 | Kraus | 74/200 |
| 3,244,025 | 4/1966 | Francisco | 74/690 |
| 3,299,744 | 1/1967 | Kraus | 74/690 X |
| 3,545,302 | 12/1970 | Schofield | 74/691 |

*Primary Examiner*—Samuel Scott
*Assistant Examiner*—Lance W. Chandler

[57] ABSTRACT

A variable ratio rotary motion transmitting device having a toric input and output traction disc disposed at opposite sides of an intermediate traction disc and coupled to input and output shafts. The intermediate traction disc has a toric surface formed at each side corresponding to the toric surfaces formed on the facing input and output traction discs. Motion transmitting means are disposed between the output and input traction discs and the intermediate traction disc and engage the toric surfaces at variable circles of contact.

6 Claims, 1 Drawing Figure

PATENTED JUN 28 1974 3,820,416
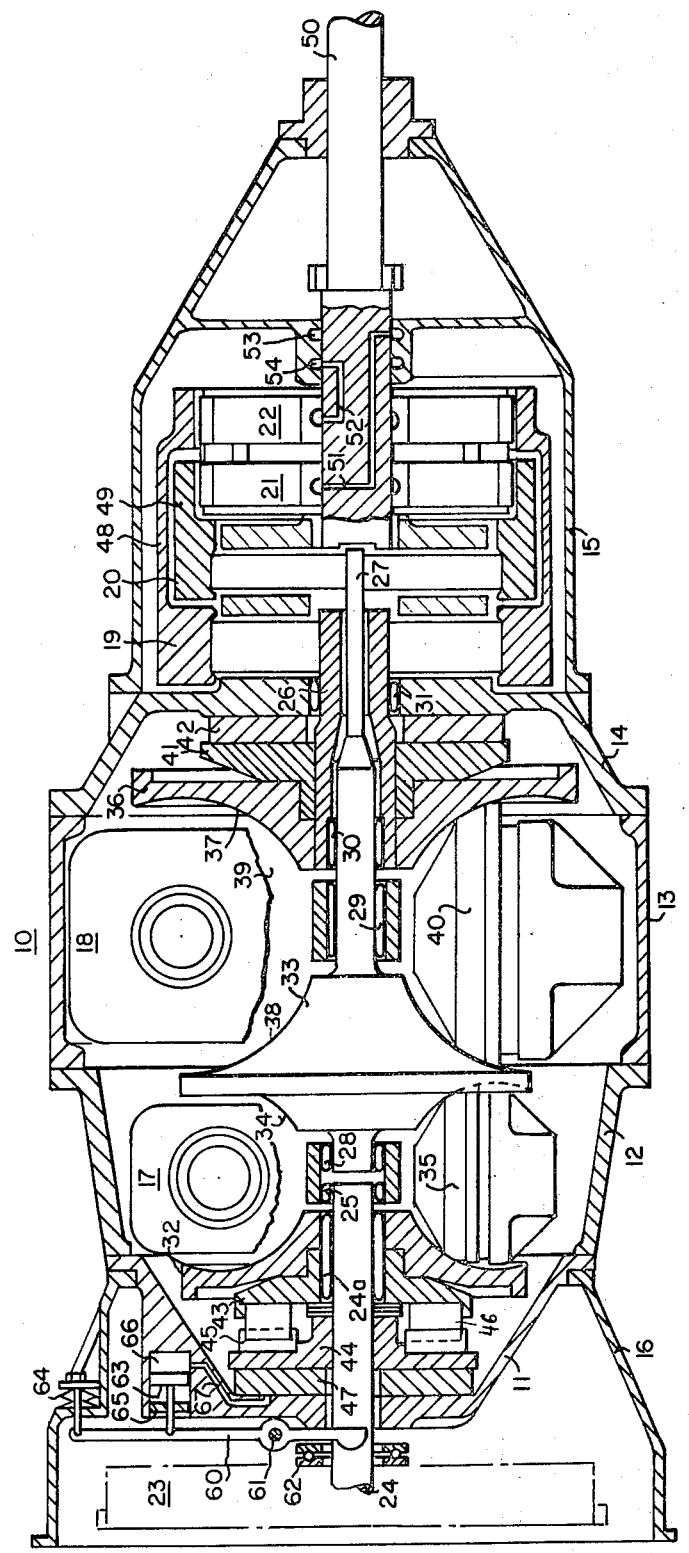

3,820,416

VARIABLE RATIO ROTARY MOTION TRANSMITTING DEVICE

BACKGROUND OF THE INVENTION

The invention relates to a variable ratio motion transmitting device in which motion is transmitted from an input toric disc to an output toric disc by friction rollers disposed between and in engagement with the facing surfaces of the discs at variable circles of contact.

Such friction roller transmissions have infinitely variable speed transmission ratios but the range of transmission ratios for efficient operation is relatively small, at least much smaller than necessary for many applications. For example, a toroidal-type transmission as described in U.S. Pat. No. 3,299,744 has an efficient speed ratio changing range of about 1:5. However, for many vehicle transmissions, for example, a much larger transmission ratio range is necessary or torque converters must be used to cover the ranges not covered by the transmission just as torque converters are used with gear shift transmissions to cover the ranges between the shifting steps. Wider ranges are particularly needed for large trucks, off highway vehicles and vehicles powered by turbines or rankine engines.

SUMMARY OF THE INVENTION

A variable ratio rotary motion transmitting device with a large range of speed transmission ratios is provided, wherein input and output toric traction discs are coupled with input and output shafts and an intermediate toric traction disc is disposed between the input and output traction discs with variable ratio rotary motion transmitting friction rollers disposed between the input and intermediate traction discs and the intermediate and output traction discs thereby forming a tandem variable ratio transmission arrangement covering a large range of infinitely variable transmission ratios. Also, the intermediate traction disc serves for reversing the direction of rotation of the output shaft when coupled thereto.

BRIEF DESCRIPTION OF THE DRAWING

The single FIGURE is a cross-sectional view along the axis of the input and output shafts of the device showing the arrangement of the traction disc between the input and output shafts.

As shown in the FIGURE, the rotary motion transmission has a housing 10 which consists of a front part 11 mounted on a central input part 12 which is connected to a central output part 13, and a rear part 14, the input part 12 and output part 13 surrounding input and output traction roller speed changing units 17 and 18, respectively. A speed reduction housing 15 is connected to the housing part 14 and receives planetary speed reduction devices 19 and 20 and clutches 21 and 22. An adapter housing 16 is mounted on the front part 11 for connecting the transmission to a drive motor.

A start-up clutch 23 is disposed in the adapter housing 16 and adapted to transmit power from the drive motor to an input shaft 24 extending through the front part 11 and supported in the transmission housing by a bearing 25. First and second concentric output shafts 26 and 27 extend through the rear housing part 14, the inner shaft 27 being rotatably supported in the housing part 12 by a bearing 28 and in the housing part 13 by a roller bearing 29, the outer shaft 26 being supported on the inner shaft by a bearing 30 and in the housing part 14 by a bearing 31.

The input shaft 24 carries an input traction disc 32 and the inner output shaft 27 carries an intermediate traction disc 33 having one side disposed opposite the input traction disc 32 to form a toroidal cavity 34 receiving first rotary motion transmitting rollers 35 for the transmission of motion from the input traction disc 32 to the intermediate traction disc 33. The outer output shaft 26 carries an output traction disc 36 having a toroidal face 37 disposed opposite a toroidal face 38 formed at the other side of the intermediate traction disc 33 to form a toroidal cavity 39 receiving second rotary motion transmitting rollers 40 for the transmission of motion from the intermediate traction disc 33 to the output traction disc 36.

The input and output traction roller speed changing units 17 and 18 are preferably of the type as described and claimed in applicant's copending application, Ser. No. 306,909, filed Nov. 16, 1972. However, other types of traction roller speed changing devices such as described in U.S. Pat. No. 3,299,744 may be used. Particulars of the speed changing arrangements will, therefore, not be described.

The output traction disc 36 is axially supported by an axial output thrust member 41, both the disc 36 and the member 41 being mounted on the outer shaft 26 for rotation therewith, and a hydrostatic axial thrust bearing 42 is disposed between the thrust member 41 and the housing part 14 to provide axial support for the output traction disc 36.

The input traction disc 32 is axially supported by an axial input thrust member 43, the input traction disc 32 and the thrust member 43 being together rotatably supported on the input shaft 24 as by a roller bearing 24a. An axial pressure plate 44 is disposed adjacent the thrust member 43 and firmly mounted on the input shaft 24 for rotation therewith. The axial pressure plate 44 has cam faces 45 arranged opposite the thrust member 43 and rollers 46 are disposed between the cam faces 45 and the thrust member 43 to be wedged therebetween and force the thrust member 43 and the pressure plate 44 apart from each other when the input shaft is rotated. A hydrostatic axial thrust bearing 47 is disposed between the axial pressure plate 44 and the front part 11 of the housing to provide axial support for the pressure plate 44.

With this arrangement, a torque transmitted through the transmission causes engagement of the input traction rollers 35 with the input traction disc 32 and the intermediate traction disc 33 and, at the same time, engagement of the output traction rollers 40 with the intermediate traction disc 33 and the output traction disc 36. Rotation of the input shaft in one direction causes rotation of the intermediate traction disc and the associated inner output shaft 27 in the opposite direction and rotation of the output traction disc 36 and the associated outer output shaft 26 in the same direction as the input shaft 24.

The outer output shaft 26 extends into the forward speed reduction planetary drive 19 and the inner output shaft 27 extends into the reverse speed reduction planetary drive 20. The rim 48 of the planetary drive 19 is operatively connected to the clutch 22 and the rim 49 of the planetary drive 20 is operatively connected to the clutch 21, both clutches being associated with a final output shaft 50 for selectively transmitting motion from either the forward speed reduction planetary drive 19 or the reverse speed reduction planetary drive 20 to the final output shaft 50 which is journalled in the speed reduction housing 15.

The final output shaft 50 has pressurized fluid passages 51 and 52 providing communication between pressurized fluid supply lines 53 and 54, respectively, for selectively supplying a clutch engaging pressurized fluid to either of the clutches 21 and 22 to connect the final output shaft 50 either with the output traction disc 36 for forward operation, or to the intermediate traction disc 33 for reverse operation.

Power is obtained from the drive motor through the start-up clutch 23 which is only schematically shown. The operating mechanism for the start-up clutch, however, is attached to the front part 11 of the housing 10 and includes an operating lever 60 pivotally supported at 61 on the housing front part 11 and having its shorter arm in abutment with the clutch throw-out bearing 62 and an operating piston 63 connected to its longer end, the operating piston 63 being movable in a cylindrical opening 65 formed in the housing front part 11. The longer arm of the clutch operating lever 60 is further provided with adjustable spring means 64 operative to force the lever 60 in a direction to disengage the startup clutch 23. The piston 63 is operated by pressurized fluid to actuate the operating lever 60 against the forces of the spring means 64 when pressurized fluid is admitted to the cylinder chamber 66. The cylinder chamber 66 is in communication by passage 67 with the hydrostatic thrust bearing 47 or the chamber 66 and the various hydrostatic thrust bearings 47 are supplied from the same source of pressurized fluid to make sure that power is transmitted through the transmission only when the hydrostatic axial thrust bearings are operative.

The speed reduction planetary drives 19 and 20 may be planetary gear drives but preferably are planetary friction roller drives of the type disclosed in applicant's application, Ser. No. 269,531, now U.S. Pat. No. 3,776,051, filed July 7, 1972. Also, the clutches 21 and 22 may be of any type capable of causing selective engagement between the planetary drive rims 48 or 49 and the final output shaft 50, but preferably are of the type disclosed in applicant's copending application, Ser. No. 321,293, filed Jan. 5, 1973.

The use of two speed changing units 17 and 18 provides for a large speed range for forward operation when both units are employed in series and a sufficient speed range for reverse operation when only one of the speed changing units is employed. There is no need for a special gearing arrangement for reverse operation as the power for reverse operation is derived from the intermedaite friction disc 33 which, during operation, is rotating in a direction opposite to that of the output friction disc 36 from which power is taken during forward operation.

The invention is, of course, not limited to the arrangement as described and shown in the drawings. It is, for example, not always necessary to have an output shaft speed which is lower than the input shaft speed. Then the outer shaft 26 could be directly coupled with the clutch 22 and the inner shaft 27 could be directly coupled with the clutch 21. Also, it would be possible to provide a single speed reduction gearing arrangement for forward and reverse operation if such gearing arrangement is arranged in the drive train after the forward and reverse clutches. It would, furthermore, be possible to have the output shaft extending through the output friction disc 36 and through the output speed changing unit 18 into the intermediate traction disc 33 and means may be provided for selectively engaging the output shaft with either the output traction disc 36 or the intermediate traction disc 33.

What is claimed is:

1. A variable ratio rotary motion transmitting device, comprising coaxial input and output shafts, an input toric traction disc mounted for rotation with the input shaft and an output toric traction disc mounted for rotation about the axis of the input and output shafts, an intermediate traction disc disposed between the input and output traction discs, said intermediate traction disc having toric surfaces respectively facing a corresponding toric surface of the adjacent input and output traction discs, motion transmitting means disposed between and engaging the toric surfaces of said input and intermediate traction discs and said intermediate and output traction discs, respectively, for the transmission of motion from the input to the intermediate traction disc and from the intermediate traction disc to the output traction disc at variable circles of contact, means for forcing said input and output traction discs toward each other to cause frictional engagement between the motion transmitting means and the traction discs and means for coupling said output traction disc with said output shaft.

2. A rotary motion transmitting device as claimed in claim 1, wherein at least the motion transmitting means disposed between the intermediate and the output traction discs are traction rollers causing rotation of the intermediate and output traction discs in opposite directions and means are provided for selectively coupling said output shaft with either one of said intermediate and output traction discs.

3. A rotary motion transmitting device as claimed in claim 2, wherein said intermediate and said output traction discs are mounted on concentric shafts, the intermediate traction disc shaft extending through the output traction disc shaft, and said means for selectively coupling the output shaft with either one of the intermediate and output traction discs are clutches adapted to couple said output shaft to either one of said concentric shafts.

4. A rotary motion transmitting device as claimed in claim 3, wherein a planetary speed reduction drive is associated with each of said concentric shafts, each of said planetary speed reduction drives having a sun member formed by one of said concentric shafts and its drive rim connected to one of said clutches.

5. A rotary motion transmitting device as claimed in claim 4, wherein said planetary speed reduction drives are friction roller planetary drives.

6. A rotary motion transmitting device as claimed in claim 1, wherein a hydraulically operated drive clutch is associated with the input shaft for connecting the input shaft to a motor and wherein hydrostatic axial thrust bearings are provided for axially supporting the input and output traction discs, said hydraulically operated clutch being supplied by the same source of hydraulic pressure as the axial thrust bearings to permit engagement of the drive clutch only when pressurized fluid is also supplied to axial thrust bearings.

* * * * *